United States Patent [19]
Johnson et al.

[11] Patent Number: 5,144,613
[45] Date of Patent: Sep. 1, 1992

[54] THERMAL BULK ERASURE METHOD FOR DYE POLYMER OPTICAL MEDIA

[75] Inventors: Sheryl L. Johnson; Bryan K. Clark, both of Sunnyvale, Calif.

[73] Assignee: Tandy Corporation, Fort Worth, Tex.

[21] Appl. No.: 558,892

[22] Filed: Jul. 26, 1990

[51] Int. Cl.$^5$ .......................... G11B 7/00; G11B 7/30
[52] U.S. Cl. ................................ 369/100; 369/275.2
[58] Field of Search ............... 369/200, 282, 283, 284, 369/286, 288, 100, 275.2, 275.1

[56] References Cited

U.S. PATENT DOCUMENTS

| | | |
|---|---|---|
| 4,398,203 | 8/1983 | Cornet . |
| 4,430,659 | 2/1984 | Maffitt et al. . |
| 4,527,173 | 7/1985 | Gupta et al. . |
| 4,578,788 | 3/1986 | Ahn et al. . |
| 4,587,533 | 5/1986 | Nakane et al. . |
| 4,598,395 | 7/1986 | Smith ................................ 369/100 |
| 4,645,712 | 2/1987 | Ishigaki et al. . |
| 4,651,172 | 3/1987 | Watanabe et al. . |
| 4,673,626 | 6/1987 | Takeda et al. . |
| 4,680,458 | 7/1987 | Drexler . |
| 4,709,363 | 11/1987 | Dirks et al. . |
| 4,710,452 | 12/1987 | Raychaudhuri . |
| 4,719,615 | 1/1988 | Feyrer et al. . |
| 4,773,059 | 9/1988 | Minemura et al. . |
| 4,780,867 | 10/1988 | Lind et al. ............................ 369/100 |
| 4,798,785 | 1/1989 | Pan et al. . |
| 4,825,430 | 4/1989 | Halter et al. . |
| 4,852,075 | 7/1989 | Feyrer et al. . |
| 4,852,077 | 7/1989 | Clark et al. . |
| 4,855,992 | 8/1989 | Ikegawa et al. . |
| 4,879,709 | 11/1989 | Clark . |
| 4,896,314 | 1/1990 | Skiens et al. . |
| 4,970,711 | 11/1990 | Martin et al. ....................... 369/100 |
| 4,975,358 | 12/1990 | Sonnenschein et al. ......... 346/135.1 |

FOREIGN PATENT DOCUMENTS

| | | |
|---|---|---|
| 1229410 | 11/1987 | Canada . |
| 0136070 | 4/1985 | European Pat. Off. . |
| 0263641 | 4/1988 | European Pat. Off. . |
| 0338776 | 10/1989 | European Pat. Off. . |

OTHER PUBLICATIONS

Miyaoka, "Digital Audio is Compact and Rugged," *IEEE Spectrum* (Mar. 1984) pp. 35-39.
Watkinson, *The Art of Digital Audio*, Chapter 13, pp. 440-486, Focal Press (1988).
Sales Materials, Indalloy (1989).
Hartman, et al., "Erasable Bilayer Dye-Polymer Optical Recording Medium".
Martin, et al., USSN 152, 696, field Feb. 05, 1988, entitled "Bulk Eraser for Optical Memory Media".
Hsieh, USSN 459,923, filed Jan. 02, 1990, entitled "System and Method for Erasing Light-Responsive Optical Disks".

*Primary Examiner*—Roy N. Envall, Jr.
*Assistant Examiner*—Nabil Hindi
*Attorney, Agent, or Firm*—Townsend and Townsend

[57] ABSTRACT

A method of achieving a bulk erasure of a dye polymer optical storage media which includes a substrate, an expansion layer, and a retention layer. The optical storage media is placed into a temperature controlled environment in which the temperature is increased at a first prescribed rate to a prescribed temperature exceeding the glass transition temperature of the retention layer of the media. Above the glass transition temperature, the retention layer is transformed from a glass-like state to a viscoelastic state. While in the viscoelastic state, the retention layer shape conforms to the expansion layer to achieve the unrecorded media configuration (i.e. flat). The temperature of the controlled environment is maintained at the prescribed temperature for a specified period of time to achieve the bulk erasure, then reduced at a second prescribed rate. By controlling the prescribed temperature and specified time period, the media is erased in bulk providing an unrecorded media ready for use. The prescribed temperature, specified time period and temperature change rates are selected to avoid thermal shock and polymer degradation and thus enable many record/erase transitions of the media.

6 Claims, 2 Drawing Sheets

THERMAL BULK ERASURE METHOD FOR DYE POLYMER OPTICAL MEDIA

CROSS REFERENCE TO RELATED APPLICATIONS

This invention is related to U.S. patent application Ser. No. 07/152,696, filed Feb. 5, 1988 for BULK ERASURE FOR OPTICAL MEMORY MEDIA; U.S. patent application Ser. No. 07/459,923, filed Jan. 2, 1990 for SYSTEM AND METHOD FOR ERASING LIGHT-RESPONSIVE OPTICAL DISKS; and U.S. patent application Ser. No. 07/414,044, filed Sep. 28, 1989 for SINGLE RETENTION/REFLECTIVE LAYER RECORDABLE/ERASABLE OPTICAL MEDIA. The entire content of such applications are incorporated herein by reference and made a part hereof.

BACKGROUND OF THE INVENTION

This invention relates to a method of erasing an optical storage media. More particularly, this invention relates to a method for controlling the thermal environment of a dye polymer optical storage media to achieve a bulk erasure.

A conventional dye polymer optical disk is formed from a substrate, a retention layer, and an expansion layer. The expansion and retention layers each contain dyes specifically chosen for absorbing light at given wavelengths. The expansion layer contains a dye which will absorb light of a prescribed first wavelength while substantially reflecting light at other wavelengths. Accordingly, exposure to light at the first wavelength results in a heating of the expansion layer due to the absorbed light energy. The retention layer typically contains a percentage of the same dye as the expansion layer, but at a smaller percentage. Accordingly, exposure to light at the first wavelength results in a heating of the retention layer, though at a lesser rate than the expansion layer. In addition, the retention layer includes a percentage of another dye which will absorb light at a second prescribed wavelength. Accordingly, exposure to light at the second wavelength results in a heating of the retention layer due to the absorbed light energy.

Alternatively, a reflective layer may be included between the expansion layer and retention layer. For such an embodiment, the laser is input to the media from opposite sides of the media onto the expansion layer and retention layer, respectively. The reflective layer prevents the light entering from the expansion layer side from passing to the retention layer. Similarly, the reflective layer prevents light entering from the retention layer side from passing to the expansion layer.

To record data onto the optical disk, a laser beam having a particular "record" wavelength (e.g., the first wavelength corresponding to the dye of the expansion layer) is focused at an the area to receive data. The focused laser heats the expansion layer at such area causing a localized expansion (i.e. a bump) away from the substrate into the retention layer.

The focused laser also heats the retention layer, though not as much, as described above. The radiation heating by the laser, along with the conduction heating resulting from the contact with the expansion layer (e.g., the non-reflective layer embodiments), causes the retention layer to increase in temperature. As the temperature of the retention layer increases above its glass transition temperature (Tg), the local area of the retention layer transforms to a rubbery state deforming to accommodate the bump of the expansion layer. Because the retention layer cools quickly relative to the expansion layer, upon removal of the laser beam the retention layer cools below its glass transition temperature before the expansion layer has cooled. As a result, when the retention layer returns to the glass-like state, the bump in the expansion layer is still present and thus is fixed in the retention layer. The area of the expansion layer previously exposed to the laser beam is maintained in the stressed bump state even after cooling due to the non-separable contact between the retention layer and expansion layer.

One technique for erasing the "bump" is localized "spot" erasure. A laser beam at an "erase" wavelength (e.g., second wavelength corresponding to the dye of the retention layer) is focused at the bump to be erased causing the retention layer in the local area to be heated. The retention layer is heated above its glass transition temperature transforming the area to a rubbery state. The stressed expansion layer area may then return to its relaxed flat state pulling the retention layer area with it. Upon removal of the laser beam the retention layer, now in a flat unrecorded configuration, cools and transforms back to its glass-like state.

The use of a laser beam having a "record" wavelength to accomplish data recording and a laser beam having an "erase" wavelength to accomplish a spot erasure limits the use of the storage media to systems having two lasers or systems with the capability to control the laser source to generate a laser beam at alternative wavelengths. Thus, it is typical to limit products to being read only devices. Such is the case for most commercial optical CD players. Accordingly, there is a need for an alternate erasure method.

To accomplish erasure of an optical disk according to the spot erasure technique requires serially processing each bump to return the local area to a flat state. Thus, tracking of the entire media is needed to accomplish a erasure of the disk. For an audio CD, the erase laser beam must pass over the recorded data tracks sequentially tracking the recorded data "bumps". If tracking is improper errors result leaving data points which are not erased.

Spot erasure also requires strict control of the laser power and exposure time to relax the retention layer without overheating the expansion layer. In addition, overheating of the retention layer itself is a problem in that the polymer forming the layer may degrade altering the glass transition temperature and coefficient of thermal expansion. Non-uniform thermal conditions within the expansion layer or retention layer are to be avoided to prevent non-uniform erasures and degradation of the optical media.

A method for accomplishing a bulk erasure with each bump being erased at the same time rather than serially is needed. Moreover, a bulk erasure method providing a temperature controlled environment is provide for uniformity and avoid degradation of the optical media.

SUMMARY OF THE INVENTION

According to one aspect of the invention, the thermal properties of an optical storage media, including the heat modulus and glass transition temperature, define a time versus temperature threshold erasure curve from which media specific erasure parameters may be chosen.

According to another aspect of the invention, bulk erasure of an optical storage media is accomplished by placing the media in a temperature controlled environment as defined by the media specific erasure parameters for a specified period of time. While in such environment, the retention layer and expansion layer of the media soften according to their respective viscoelastic properties enabling the stressed expansion layer areas and retention layer areas to return to their original, relaxed shape. As a result, the unrecorded (i.e. flat) configuration is achieved.

According to another aspect of the invention, the optical storage media is exposed to a controlled temperature transition up to a prescribed temperature at which erasure occurs, then down to an appropriate end temperature, such as the ambient temperature. By controlling the temperature transitions, thermal shock (in which the media's thermal characteristics are changed) and degradation of the substrate and polymer layers are avoided.

According to one embodiment of the invention, an optical storage media is placed into a temperature controlled oven at approximately room temperature. The oven chamber then is heated to a specified temperature at a controlled rate of temperature increase. The temperature then is maintained for a prescribed period during which erasure occurs. After the prescribed time, the temperature is reduced at a controlled rate back to the ambient temperature. The erased unrecorded disk then is removed.

DETAILED DESCRIPTION OF A PREFERRED EMBODIMENT

Figure 1:
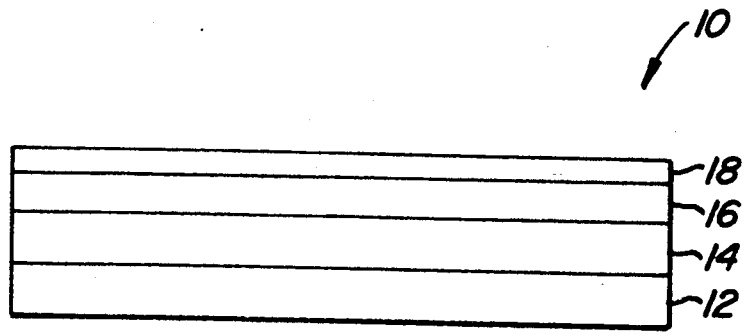
FIG. 1 is a diagram of an erased unrecorded configuration of a dye polymer optical storage media.

A dye polymer optical storage media 10 typically includes a rigid substrate 12, a first polymer layer 14 and a second polymer layer 16. The first polymer layer 14 generally is referred to as the expansion layer. The second layer generally is referred to as the retention layer. A protective layer 18 also may be included, such that the first and second layers 14, 16 are sandwiched between the substrate 12 and protective layer 18.

The materials used in forming the layers 14, 16 are selected for their transparency, reflectivity, absorbtivity, glass transition temperature, elasticity and thermal expansivity. Preferred materials for each layer include amorphous polymers. A description of a preferred media, including material properties is described in commonly-assigned U.S. patent application Ser. No. 07/414,044 filed Sep. 8, 1989 for SINGLE RETENTION/REFLECTIVE LAYER RECORDABLE/ERASABLE OPTICAL MEDIA, which application is incorporated herein in its entirety by reference.

The expansion layer 14 absorbs a percentage of the light energy to which it is exposed. For example the degree of absorbtivity may be 20% to 40% for the "record" wavelength and less than 10% at the "erase" wavelength. The layer 14 has a high coefficient of thermal expansion relative to the retention layer 16. Preferably the coefficient of thermal expansion is greater than $1 \times 10^{-4}$ degrees Celsius. A high coefficient of elasticity also is typical to the extent that the expansion layer 14 will expand readily when heated at the temperatures encountered during a record process (without exceeding its upper expansive limit) and contract readily to its original flat condition upon cooling. Typically, the expansion layer 14 is rubbery at ambient temperature. The glass transition temperature of the expansion layer 14, typically, is less than 30 degrees Celsius, but in some cases can be as high as 60 degrees Celsius.

The retention layer 16 also absorbs a percentage of light energy passing through it. For example, the degree of absorbtivity may be 20% to 30% at "record" wavelengths and greater at "erase" wavelengths. As a result, the retention layer 16 will heat up slower than the expansion layer 14 during a record operation and will heat up much faster than the expansion layer 14 during an erase operation.

The glass transition temperature of the retention layer 16 typically is above room temperature and higher than the glass transition temperature of the expansion layer. Above the glass transition temperature, the retention layer 16 has sufficient elasticity to conform to deformations in the expansion layer 14. The retention layer 16, however, exhibits sufficient rigidity and strength below its glass transition temperature to hold the expansion layer 14 in an expanded deformed condition even after the expansion layer 14 cools to an ambient temperature.

Referring to FIG. 1, an unrecorded dye polymer optical storage media 10 is shown including the substrate 12, expansion layer 14, retention layer 16 and protective layer 18 as described. The unrecorded configuration is characterized by the flat expansion and retention layers 14, 16.

Figure 2:
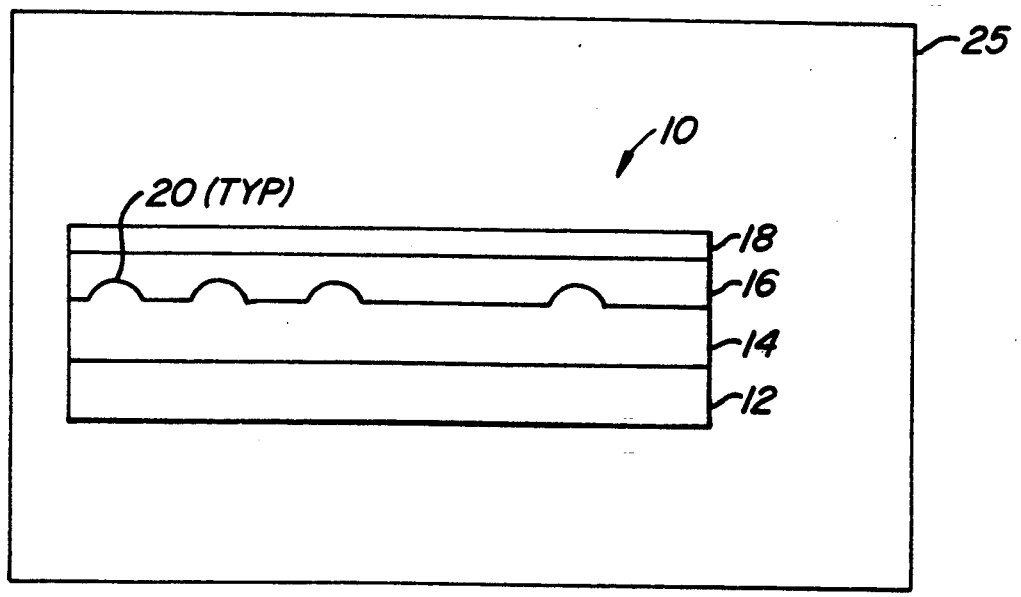
FIG. 2 is a diagram of a data recorded configuration of a dye polymer optical storage media.

Referring to FIG. 2, a dye polymer optical storage media 10 in a recorded configuration is shown. The recorded configuration is characterized by the bumps 20 in the expansion layer 14 which protrude into the retention layer 16. While "playing" or accessing the optical media 10, the bumps 20 designate data stored on the media. For digital media (as illustrated) the bumps 20 are of equal length and may appear at multiples of a specific interval distance. For analog media the bumps 20 may vary as to length and spacing.

Threshold Erasure Curve

Figure 3:
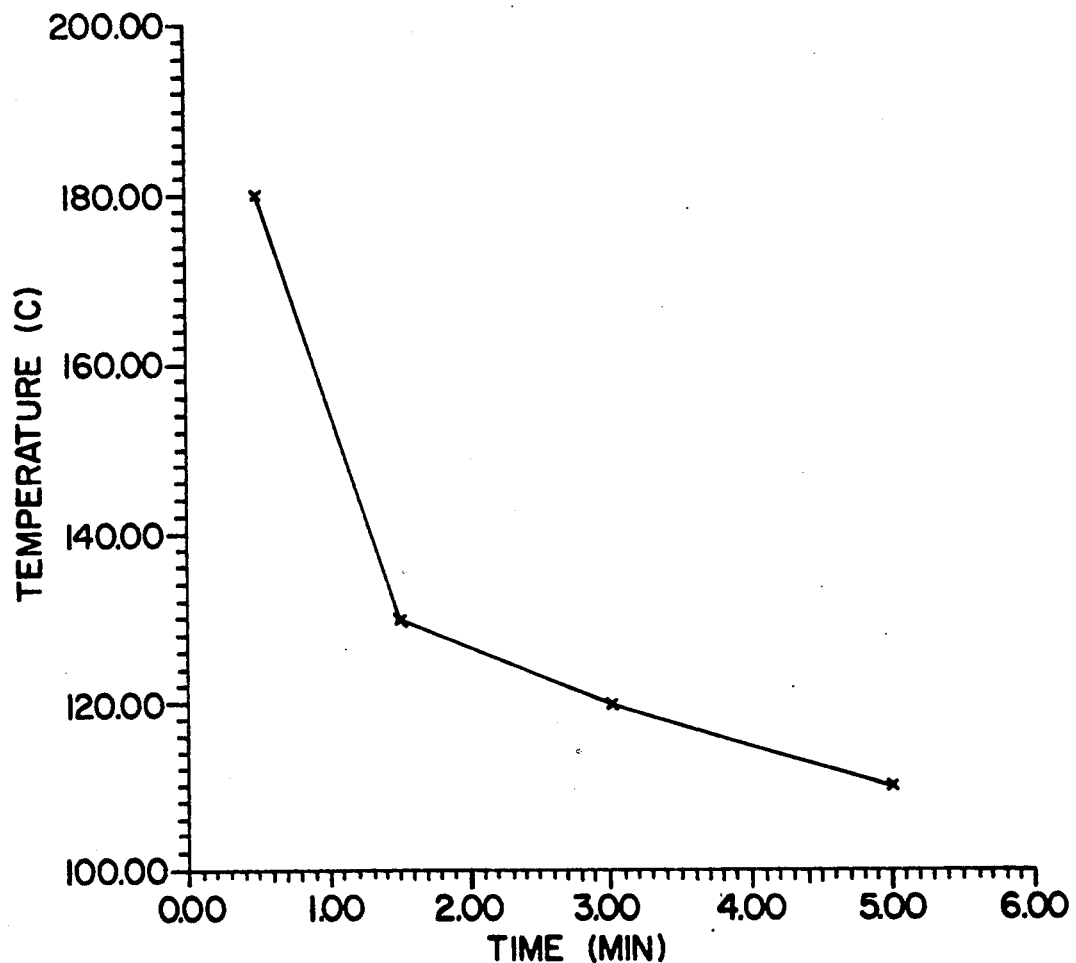
FIG. 3 is a time vs. temperature erasure curve for a dye polymer optical storage media.

For a dye polymer optical storage media of known composition, the thermal characteristics determine a minimum time to accomplish satisfactorily a bulk erasure at a certain temperature. FIG. 3 shows a threshold erasure curve of the minimum time to accomplish an erasure for various temperatures derived experimentally for a non-metallic dye polymer optical storage media. The curve may vary slightly for different optical media materials, depending upon the respective glass transition temperatures, coefficients of thermal expansion, viscoelasticities and Young's modulii for the respective expansion layer 14 and retention layer 16.

As seen from the threshold erasure curve of FIG. 3, an approximate inverse relationship exists between the minimum time and the specific temperature. Note that the curve runs from approximately 110 degrees Celsius to approximately 180 degrees Celsius to define a temperature range at which erasure operations may be performed satisfactorily. The range may vary according to the factors described above which determine the curve, but outside of the respective range, the erasure operation is not achieved satisfactorily. As the glass transition temperature of the retention layer used to derive the curve is approximately 110 degrees, erasure cannot occur below 110 degrees. Similarly, because the maximum temperature above which the expansion layer will no longer return to its original shape is approximately 180 degrees, material degradation occurs above approximately 180 degrees.

A particular point on the threshold erasure curve is selected for accomplishing bulk erasures The particular point selected is determined experimentally such that repeated record-erase transitions do not result in degraded performance of the media. The selected point defines a prescribed temperature and specified time period at which the bulk erasure is performed. According to a preferred embodiment for an optical storage media as described above, a bulk erasure can be achieved at a temperature of 130 degrees Celsius in approximately 1.5 minutes or more. At lower temperatures such as 120 degrees Celsius, the bulk erasure can be achieved in approximately 3.0 minutes or more.

In operation, the prescribed temperature and specified time may be fixed so as to perform with the same time and temperature parameters in all cases, or enable different times and temperatures for different media based upon the composition of the individual media.

Bulk Erasure of Optical Media

Having described the formation of a threshold erasure curve and the selection of a prescribed temperature and specified time period, the description of a bulk erasure operation according to a preferred embodiment of the invention is described below.

The media 10 to be erased in bulk is placed into an environmentally controlled chamber preset to the ambient room temperature. The temperature then is increased at a specified rate to the prescribed temperature. Above the glass transition temperature, the retention layer 16 transforms to a rubbery viscoelastic state. At the prescribed temperature, above the glass transition temperature, the retention layer 16 is maintained in the viscoelastic state. Such prescribed temperature is maintained for the specified time period during which the expansion layer 14 returns to its relaxed flat configuration. The retention layer 16 attached to the expansion layer 14 and in its viscoelastic state conforms to the expansion layer 14 shape so as to return to the flat unrecorded configuration. By maintaining the environment stable at the prescribed temperature for the specified time period the layers 14, 16 return fully and reliably to the flat unrecorded configuration.

After the specified time period, the temperature is reduced at a specific rate to the ambient room temperature, whereupon the media may be removed. The erased disk 10 now is ready for recording once again.

The temperature change rates for increasing the temperature and for decreasing the temperature are selected to avoid thermal shock to the media. As a result, the storage media thermal properties do not degrade and the temperature time erasure curve remains valid. As the prescribed temperature and specified time period may be set in the factory for an apparatus embodying the invention, the continued reliability of the time temperature erasure curve is achieved. Accordingly, the media may experience a long life time of recordings and bulk erasures without degraded performance.

The temperature change rates may range from 3 to 10 minutes to go between the ambient temperature and the prescribed temperature. Times even lower than 3 minutes are possible for media having glass transition temperatures less than 110 degrees Celsius.

In an alternative embodiment, the optical storage media may be placed into an environmentally controlled chamber which is already at the prescribed temperature, remain exposed to such temperature for the specified time period, then be removed. This method is preferable to shorten the erasure time for media which are composed of materials having the appropriate thermal properties to avoid thermal shock or degradation in performance upon repeated erasure operations.

Still another alternative for reducing the bulk erasure time is to place the media into an environmentally controlled chamber at a temperature somewhere between the ambient temperature and the prescribed temperature, then increase the temperature at a certain rate to the prescribed temperature. After the specified time period, the temperature is reduced at a certain rate to some temperature above the ambient temperature, then removed. Selection of the insertion and removal temperatures is determined to reduce the erasure time, while substantially eliminating the chances of thermal shock and degradation.

Although a preferred embodiment of the invention has been illustrated and described, the invention may include alternative embodiments and changes. Accordingly, the scope of the invention is intended to be determined by the claims.

What is claimed is:

1. A method for achieving a bulk erasure of a dye polymer optical storage media including a substrate, an expansion layer and a retention layer, the method comprising the steps:

exposing the entire optical storage media to a controlled temperature environment at a prescribed temperature exceeding the glass transition temperatures of the retention and expansion layers of the media, said optical storage media being exposed to said prescribed temperature for at least about 1.5 minutes;

transforming the retention layer from a glass-like state to a viscoelastic state while the temperature of said environment is at or above the glass transition temperature of the retention layer;

returning the expansion layer to a relaxed shape while in a visco-elastic state; and conforming the retention layer shape to the expansion layer while the retention layer is in a viscoelastic state to achieve an unrecorded media configuration.

2. A method of bulk erasure of a dye polymer optical storage media including a substrate, an expansion layer and a retention layer, comprising the steps:

placing the optical storage media into a temperature controlled environment having an initial temperature and a final temperature;

increasing the temperature of the environment at a first prescribed rate to a prescribed temperature exceeding the respective glass transition temperatures of the retention layer and expansion layer of the media, said first prescribed rate being greater than about three minutes to increase from said initial temperature to said prescribed temperature;

transforming the retention layer from a glass-like state to a viscoelastic state while the temperature of said environment is at or above the glass transition temperature of the retention layer;

returning the expansion layer to a relaxed shape while in a viscoelastic state;

conforming the retention layer shape to the expansion layer while the retention layer is in a viscoelastic state to achieve an unrecorded media configuration;

maintaining the controlled environment at said prescribed temperature for a specified period of time;

reducing the temperature of said environment at a second prescribed rate, said second prescribed rate being greater than about three minutes to decrease from said prescribed temperature to said final temperature.

3. The method of claim 2 further comprising a step of selecting said first and second prescribed rates to avoid thermal shock to the media.

4. A method of bulk erasure of a dye polymer optical storage media including a substrate, an expansion layer and a retention layer, comprising the steps:

placing the optical storage media into a temperature controlled environment having an initial temperature and a final temperature;

increasing the temperature of the environment at a first prescribed rate to a prescribed temperature exceeding the respective glass transition temperatures of the retention layer and expansion layer of the media, said first prescribed rate is between about three and about ten minutes to increase from said initial temperature to said prescribed temperature;

transforming the retention layer from a glass-like state to a viscoelastic state while the temperature of said environment is at or above the glass transition temperature of the retention layer;

returning the expansion layer to a relaxed shape while in a viscoelastic state;

conforming the retention layer shape to the expansion layer while the retention layer is in a viscoelastic state to achieve an unrecorded media configuration;

maintaining the controlled environment at said prescribed temperature for a specified period of time;

reducing the temperature of said environment at a second prescribed rate, said second prescribed rate being greater than about three minutes to decrease from said prescribed temperature to said final temperature.

5. The method of claim 4 wherein said second prescribed rate is between about three and about ten minutes to go from said prescribed temperature to said final temperature.

6. The method of claim 1 wherein said controlled temperature environment is a chamber.

* * * * *